(12) United States Patent
Seidel

(10) Patent No.: US 7,407,342 B2
(45) Date of Patent: Aug. 5, 2008

(54) OFFSHORE WIND ENERGY SYSTEM WITH NON-SKID FEET

(75) Inventor: Marc Seidel, Osnabrück (DE)

(73) Assignee: REpower Systems AG, Hamburg (DE)

( * ) Notice: Subject to any disclaimer, the term of this patent is extended or adjusted under 35 U.S.C. 154(b) by 85 days.

(21) Appl. No.: 11/390,830

(22) Filed: Mar. 28, 2006

(65) Prior Publication Data
US 2006/0222465 A1    Oct. 5, 2006

(30) Foreign Application Priority Data
Mar. 30, 2005    (DE) .................. 10 2005 014 868

(51) Int. Cl.
*E02B 17/00*    (2006.01)

(52) U.S. Cl. .................. 405/224.1; 405/224; 405/227

(58) Field of Classification Search ............. 405/224.1, 405/226, 205, 207, 208, 224, 227
See application file for complete search history.

(56) References Cited

U.S. PATENT DOCUMENTS

| 3,962,878 A | * | 6/1976 | Hansen | 405/226 |
| 4,063,426 A | * | 12/1977 | Hansen | 405/226 |
| 4,106,302 A | * | 8/1978 | Vogel | 405/226 |
| 4,109,477 A | * | 8/1978 | Vogel | 405/226 |
| 4,590,718 A | | 5/1986 | Angeloff | 52/116 |
| 6,488,446 B1 | * | 12/2002 | Riemers | 405/224.1 |
| 7,234,409 B2 | * | 6/2007 | Hansen | 405/203 |

FOREIGN PATENT DOCUMENTS

| DE | 201 00 588 U1 | 3/2001 |
| JP | 2003-28046 | 1/2003 |
| WO | WO 03/080939 A1 | 10/2003 |

* cited by examiner

*Primary Examiner*—Frederick L Lagman
(74) *Attorney, Agent, or Firm*—Nash and Titus, LLC

(57) ABSTRACT

This invention entails a wind energy system for offshore use with a longitudinal direction (L) running substantially vertically to an ocean surface in the erected state and with a plurality of feet determined for making contact with the ocean bottom whose extensions in the longitudinal direction (L), especially the depth and/or relief of the ocean bottom, are adapted to a predetermined erection site.

11 Claims, 3 Drawing Sheets

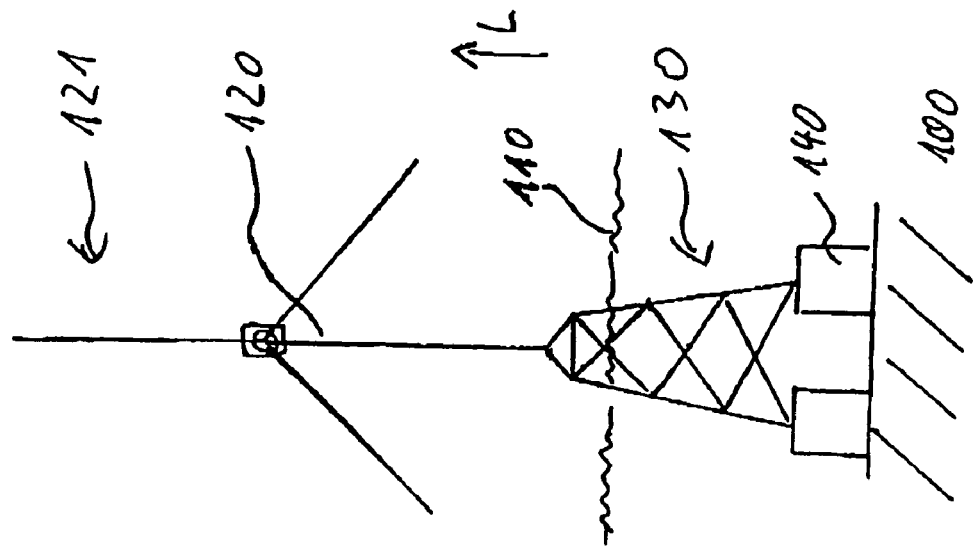
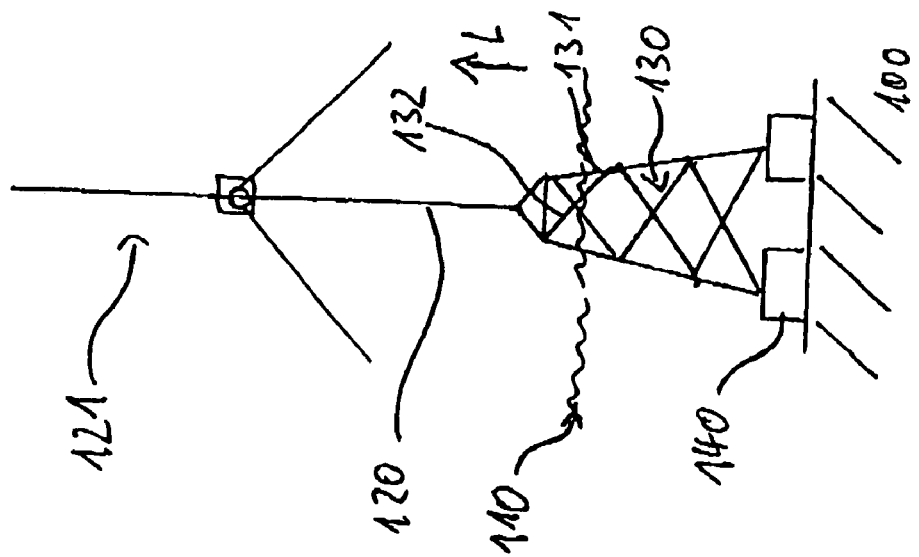

OFFSHORE WIND ENERGY SYSTEM WITH NON-SKID FEET

FIELD OF THE INVENTION

The invention relates to a wind energy system for offshore use, to a wind park including two or more of the wind energy systems, and to a method for erecting a wind energy system.

BACKGROUND OF THE INVENTION

Wind energy systems are traditionally anchored in offshore use in the form of single-post foundations on the ocean bottom. Furthermore, tripod foundations are known in which the foot of the wind energy system comprises three legs that run out from each other in a tetrahedral shape and are anchored on the ocean bottom. Moreover, foundations with jackets are known in oil platforms that have a framework construction exposed primarily to stresses of traction and pressure.

It must be taken into account, especially in offshore wind energy system parks, that the hub height of the individual wind energy systems above the ocean surface should be approximately the same for optical reasons on the one hand. On the other hand, for example, the boat docking areas can be built at the same height of the main construction in all wind energy systems by virtue of the same penetration height at the level of the ocean surface. The natural oscillation behavior of the system is less a function of the height above the ocean surface than it is of the height above the ocean bottom. Thus, the natural oscillation behavior of wind energy systems must be recalculated for each system every time that a plurality of systems is erected at different ocean depths. The obtaining of an approximately equal hub height above the ocean surface is complex in the case of such foundations because the length of the tripod or that of the jacket must be adapted in its entirety to the erection site.

WO 03/080939 A1 teaches a foundation for an offshore wind energy system comprising a suction foot to which the tower of the wind energy system is fastened with lateral struts.

DE 201 00 588 U1 discloses an offshore wind energy system comprising feet that can be flooded with water. The foot of the wind energy system can be lowered in a controlled manner by the flooding of the feet.

U.S. Pat. No. 4,590,718 teaches the foundation of an onshore wind energy system. The weight of the wind energy system is transmitted via a tower onto the ground and lateral, height-adjustable feet stabilize the entire construction.

JP 2003028046 A describes a foundation for an offshore wind energy system comprising feet with different heights, a few of which feet are arranged above the ocean surface and a few below the ocean surface.

SUMMARY OF THE INVENTION

Thus, to address the current problems in the state of the art wind energy systems, this invention, in a first aspect, available a wind energy system for offshore use in which essential parts are standardized, or otherwise made uniform and consistent, and require no individual design calculations of the entire structure. In a second aspect the invention addresses the problems in the state of the art by making available a method for erection of such a wind energy system.

The problem in the art is addressed in its first aspect by a wind energy system for offshore use with features such as a rotor comprising a rotor hub, with a longitudinal direction (L) running substantially vertically to an ocean surface in the erected state and with a carrier structure with several legs on the end of each of which a foot is arranged for making contact with the ocean bottom. There is a given height of the rotor hub above the ocean surface and each foot has an extension in the longitudinal direction (L) that compensates an interval, determined in particular by the depth and/or the relief of the ocean bottom, between the end of the foot and the ocean bottom at the particular contact point of the individual foot with the ocean bottom.

BRIEF DESCRIPTION OF THE DRAWINGS

FIG. 1 shows a schematic lateral view of an offshore wind energy system in accordance with the invention, on a flat erection site.

FIG. 2 shows a schematic lateral view of an offshore wind energy system in accordance with the invention, on a deep erection site.

DETAILED DESCRIPTION OF THE INVENTION

Figure 3A:
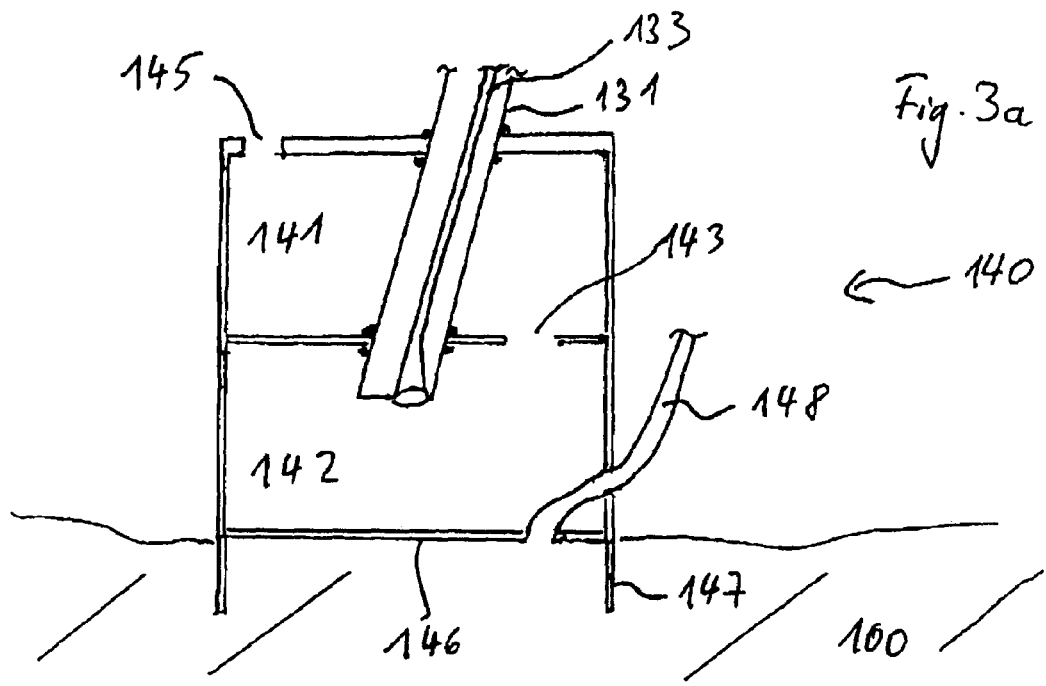
FIG. 3a shows a detailed view of a foot in a first embodiment in FIG. 1.

The wind energy system in accordance with the invention stands with its feet on the ocean bottom, which feet can be adapted in their extension in the longitudinal direction. The longitudinal direction runs along the longitudinal direction of a pipe tower of the wind energy system. Structural components such as, e.g., pipe tower, machine house and carrier structure are preferably standardized and the differing ocean bottom profile and the differing depth of the ocean at the erection side of each foot is compensated by the differing longitudinal extension of the feet in order to obtain a given rotor hub height above the sea level. The leg ends are standardized, preferably the same interval to the ocean surface and the particular clear interval between the leg end and the ocean bottom is filled up by the foot, that compensates this interval in its longitudinal extension. The longitudinal extension of a foot corresponds to the difference between the sum of the height of the rotor hub over the sea level and the depth of the ocean bottom at the contact point of the foot on the ocean bottom and the sum of the standardized lengths of pipe tower and carrier structure. The feet of a system preferably have a different longitudinal extension in order to align the system in a longitudinal direction. The feet of an individual wind energy system can have, among themselves, different extensions in the longitudinal direction, and the feet of different wind energy systems can have a different extension in the longitudinal direction of the wind energy system. The longitudinal direction of the erected wind energy system preferably runs substantially vertically to the ocean surface.

The wind energy system preferably stands with its entire weight exclusively on the feet. The carrier structure can preferably be shipped to the erection site with feet mounted and adapted in the longitudinal direction.

The wind energy system is preferably mounted with its pipe tower and rotor on a lattice tower (jacket) that is erected for the most part below the ocean surface and extends somewhat above the ocean surface. The lattice tower can comprise a plurality of legs, preferably three or four legs, on whose ends one of the feet is arranged. However, the invention is also a suited for all other multi-leg carrier structures, e.g., tripods.

Another advantage of the longitudinal adaptation of the feet in accordance with the invention is that there is little influence of the longitudinal adaptation on the height of the natural frequency because the base surface of the spread legs is large. The natural oscillation behavior needs to be calculated essentially only once for all systems of a park.

The feet advantageously comprise a structural spacing component that substantially determines the extension in the longitudinal direction and on which a leg of a lattice tower of the wind energy systems stands. It can also be sufficient, e.g., given appropriate ground profiles, to provide only one foot with a structural spacing component. The extension of the structural spacing component in the longitudinal direction is measured in such a manner that the profile of the ocean bottom is compensated and the longitudinal direction of the erected wind energy system runs substantially vertically to the ocean surface. The structural spacing component is preferably arranged on the leg end facing the ocean bottom and intended for making direct contact with the ocean bottom.

Another advantage is that the structural spacing component can comprise a hollow chamber that can be filled with heavy filler material. The extension of this hollow chamber in the longitudinal direction substantially determines the extension of the structural spacing component. The filler material used is preferably special concrete, highly refractory mortar (grout), gravel, iron ore or other ballast materials with a high density, e.g., dense magna or so-called "orecrete". A filling line for the filling material advantageously empties into the hollow chamber.

In addition to the ballasting the filler material also increases the rigidity and the firmness of the feet. A special synergistic effect is produced during the ballasting in that at locations with a great water depth, at which, as a consequence, the loads on the foundations are also especially high, especially large ballast chambers are also available that compensate the additional loads by their increased intrinsic weight.

At least two hollow chambers are advantageously provided on each foot. One hollow chamber facing away from the ocean bottom in the erected state of the wind energy system and one hollow chamber facing the ocean bottom are provided on each foot. Both hollow chambers can be connected to one another by a passage opening that conducts filler material. The hollow chambers of different feet and facing away from the ocean bottom can have the same design, which reduces manufacturing costs, so that even the feet can be standardized, at least in parts, and only the lower hollow chamber, that faces the ocean bottom, needs to be adapted in its longitudinal direction to the features of the erection site.

After the wind energy system has been erected on the ocean bottom at the predetermined erection site the hollow chamber or hollow chambers can be filled with filler material. To this end the wind energy system comprises at least one filling line, and preferably each leg has exactly one filling line for the filler material. The filling lines are preferably provided within each of the legs of the lattice tower, which makes a precise filling of each foot possible. It is also conceivable that a separate filling line empties into the hollow chamber facing away from the ocean bottom and into the hollow chamber facing the ocean bottom.

The hollow chambers facing away from the ocean bottom advantageously have the same design and thus make a further standardization possible and therewith a savings of expenses.

Adjacent hollow chambers can be connected to each other via a passage opening conducting filler material. Thus, both hollow chambers can be filled with grout via the filling line. Air can escape from the hollow chambers via air outlet openings. Each of the hollow chambers connected to each other preferably comprises its own air exit opening. The air exit openings can preferably be closed from the outside.

Each foot can comprise a stop plate that has the function of making contact with the ocean bottom and that should prevent the foot from penetrating past it and into the ocean bottom.

In a further embodiment of the invention at least one projection can project from the stop plate, which projection is designed, e.g. as a circumferential wall ring on the outer edge. The wall ring has the function of penetrating into the ocean bottom and of preventing the foot from sliding in a horizontal direction. The projection or wall ring can have an extension of several, up to 20 m in the longitudinal direction and impart the character of a post foundation to the foundation.

As another advantage, at least one foot has, and preferably each of the feet have, a suction apparatus, especially a suction bell. The suction bell faces the ocean bottom in the erected state of the wind energy system and is designed to make contact with the ocean bottom. It makes it possible for the foot equipped with it to be firmly drawn to the ocean bottom and thus to counteract not only a horizontal shifting but also a vertical shifting of the wind energy system. This makes possible as especially firm anchoring to the ocean bottom that is, in addition, simple to manage.

The suction bell is especially suitable for anchoring the preferably four feet of the lattice tower described above. The suction bell can comprise the stop plate and the wall ring as a suction-bell wall. In a preferred embodiment of the invention a connecting piece for a venting hose is provided in the suction-bell wall, preferably on the stop plate. The venting hose runs, e.g., through the lower hollow chamber to the ocean surface, where it is connected to a pump. After the wind energy system has been erected on the ocean bottom the air can be removed from the suction bell by suction and thus on the one hand draw the foot onto the ocean bottom by the vacuum developing in it until the stop plate makes contact with the ocean bottom. On the other hand, even a vertical shifting and tipping of the wind energy system is prevented by the vacuum developing in the suction bell.

As noted above, this invention also addresses certain problems in the state of the art by making available a method for erection of such a wind energy system. The problem is solved in its second aspect by a wind park for offshore use with at least two wind energy systems with a longitudinal direction running in the erected state substantially vertically to the ocean surface and with a carrier structure with several legs on whose ends facing the ocean bottom a foot is arranged designed to make contact with the ocean bottom. The towers and the carrier structures have a standardized length and the rotor hubs have the same height above the ocean surface. A different interval between the rotor hub and the ocean bottom at the particular contact point of the individual foot with the ocean bottom, which is caused in particular by the depth and/or the relief of the ocean bottom, is compensated in accordance with the invention by an adapted extension of the particular foot.

The invention makes it possible to reduce the cost of the construction of wind parks. The favorable optical impression of a wind park obtained by having the same height for the rotor hubs can also be achieved in accordance with the invention by using towers and carrier structures standardized in particular in their length. The towers and carrier structures are even preferably substantially completely standardized and therefore especially economical to manufacture. The differences of the intervals between an externally given height of the rotor hub over the ocean surface and the ocean bottom at the various erection sites of the various wind energy systems as well as the difference of the intervals between the rotor hub height and the contact point of the individual feet of a single system are compensated in order to obtain an even rotor height by feet of an adapted longitudinal extension.

The rotor hub height over the ocean surface is selected to be so high that none of the legs of the wind energy systems touches the ocean bottom when using the standardized tower and the standardized carrier structure. A foot is arranged on each of the leg ends facing the ocean bottom, the extension of which foot in the longitudinal direction corresponds to the clear interval between the leg end and the ocean bottom. The longitudinal extension of a foot corresponds to the difference between the sum of the height of the rotor hub above the sea level and the depth of the ocean bottom above the contact point of the foot on the ocean bottom and the sum of the standardized lengths of the pipe tower and of the carrier structure.

The problem in the art is also solved by a method for erecting a wind energy system for offshore use with features as follows. The method of the invention entails a wind energy system with a longitudinal direction (L) running substantially vertically to an ocean surface in the erected state and with a carrier structure with several legs on the end of each of which a foot is arranged for making contact with the ocean bottom. The depth of the ocean bottom is determined at the contact point of each foot with the ocean bottom. A desired height of the rotor hub above the ocean surface is determined. The extension of each foot in the longitudinal direction (L) is determined in such a manner that each foot has an extension in the longitudinal direction (L) that compensates an interval between the end of the leg and the ocean bottom at the particular contact point of the individual foot with the ocean bottom. The feet are mounted onto the carrier structure at the determined extension in the longitudinal direction (L).

At first, the depth of the ocean bottom is determined at each intended contact point of a foot with the ocean bottom at the erection site. The length, that is, the extension of each foot in the longitudinal direction, is determined from the results obtained. The use of the standardized carrier structure and of the tower for each wind energy system, especially for a wind energy system park, is taken into account. To this end the sum of the height of the rotor hub over the ocean surface plus the depth of the ocean bottom over the contact point of each individual foot is determined and the sum of the standardized length of the carrier structure and of the tower is subtracted from it. The clear interval, corresponding to the difference, between leg end and ocean bottom at the intended contact point of the foot with the ocean bottom corresponds to the extension of this foot in the longitudinal direction. The feet, expanded preferably differently in this manner, are then mounted on the wind energy system, preferably on the end of the associated leg of the lattice mast of the wind of energy system. The lattice mast, provided with floating bodies, is then shipped, e.g., with floating pontoons, to the erection site where it is let down to the ocean bottom by appropriately venting the floating bodies. The feet reach the intended contact point on the ocean bottom. The feet also penetrate so far into the ocean bottom that the stop plate makes contact with the ocean bottom, due to the intrinsic weight of the system and optionally due to ballast preinstalled for this purpose. The hollow chambers present in the feet are then filled with the filling material cited above, especially grout.

In a preferred embodiment of the method of the invention the wind energy system, preferably each foot of the wind energy system, comprises a suction bell. The erected wind energy system is arranged in such a manner on the ocean bottom that the suction bell seals in a substantially airtight manner with the ocean bottom. Then, the suction bell is evacuated via a venting hose connected to it and the developing vacuum sucks the foot into the ocean bottom until the stop plate makes contact with the ocean bottom and stops the penetration of the foot into the ocean bottom. The vacuum developing in the suction bell imparts additional stability to the wind energy system against shifting in a vertical direction and against tilting. After the suction bell has been evacuated it is preferably sealed in an airtight manner in order to make it possible to build up a vacuum for brief loads.

The invention will be described in five figures with reference made to exemplary embodiments.

The offshore wind energy system shown in FIG. 1 is erected on the ocean bottom 100 at an erection site by means of the lattice tower 130 and comprises pipe tower 120 represented only schematically here, extending vertically above ocean surface 110 and with a machine housing with rotor 121 on the end opposite ocean bottom 100. Four feet 140 are mounted on the end of lattice tower 130 facing ocean bottom 100 with which lattice tower 130 stands on ocean bottom 100.

Pipe tower 120 runs along longitudinal direction L of the wind energy system. Lattice tower 130 comprises four legs 131 preferably inclined at the same angle to longitudinal direction L and connected to each other by cross-linkage 132. A connection line between the end of lattice tower 130 opposite ocean bottom 100 and the end facing ocean bottom 100 also runs along longitudinal direction L.

Lattice tower 130, pipe tower 120 and the machine housing with rotor 121 are designed in a standardized manner. The rotor and a rotor hub associated with it are designated by the same reference number 121. Thus, wind energy systems designed for different erection sites can comprise the same standardized structural components cited and can be nevertheless erected in different water depths and on different ocean bottom profiles due to the different feet 140 adapted to the particular erection site. A comparison of the wind energy system in FIG. 2 with the one in FIG. 1 shows that a lattice tower 130 that is structurally the same as the wind energy system in FIG. 1 can be used in spite of the greater water depth by lengthening feet 140 in longitudinal direction L of the wind energy system. Lattice towers 130 of both wind energy systems in FIGS. 1 and 2 nevertheless extend by approximately the same height above ocean surface 110.

FIG. 3a is a detailed view of one of feet 140 shown in FIGS. 1 and 2. A leg 131 associated with foot 140 is run through hollow chamber 141 facing away from ocean bottom 100 and extends into a lower hollow chamber 142 facing ocean bottom 100. Hollow chambers 141, 142 are designed circularly or polygonally in a cross section parallel to ocean bottom 100 and exhibit a diameter transversely to longitudinal direction L of 3 m to 12 m in a 3-5 MW system. Leg 131 is welded with walls of hollow chamber 141. Upper hollow chamber 141 and lower hollow chamber 142 are connected by passage opening 143. Lower hollow chamber 142 is extended up to 15 m in longitudinal direction L. Lower hollow chamber 142 can be filled via filling line 133 in leg 131, through which line filling material can flow. The filling material used is preferably special concrete, grout, gravel or iron ore, e.g., orecrete. During the filling procedure the filling material flows, after lower hollow chamber 142 has been filled, through passage opening 143 into upper hollow chamber 141. Upper hollow chamber 141 has an air exit opening 145. Filling line 133 can also comprise two separate filling lines with which a separate filling, in particular with viscous filling material, of both hollow chambers 141, 142 is possible. An air exit opening can then also be provided in lower hollow chamber 142.

Before the wind energy system is erected the profile and the depth of ocean bottom 100 is determined at the erection site. Lower hollow chamber 142 is delimited by stop plate 146 on its side facing the ocean bottom. The position of stop plate 146 in longitudinal direction L of foot 140 is adapted to the profile and the depth of ocean bottom 100 at the erection site of the wind energy system. As a rule, the interval between ocean surface 110 and ocean bottom 100 is a function of the exact erection site of each of feet 140. The differing interval distance is compensated by feet 140 of appropriately differing lengths, that is, by a differing position of stop plate 146 in the longitudinal direction of foot 140. Stop plate 146 comprises wall ring 147 on its outer circumference on the side facing the ocean bottom, which ring digs into ocean bottom 100 until stop plate 146 rests on ocean bottom 100. It is not shown true to scale here. Wall ring 147 preferably penetrates up to 20 m into the ocean bottom. Circumferential wall ring 147 prevents a horizontal shifting of foot 140.

Figure 3B:
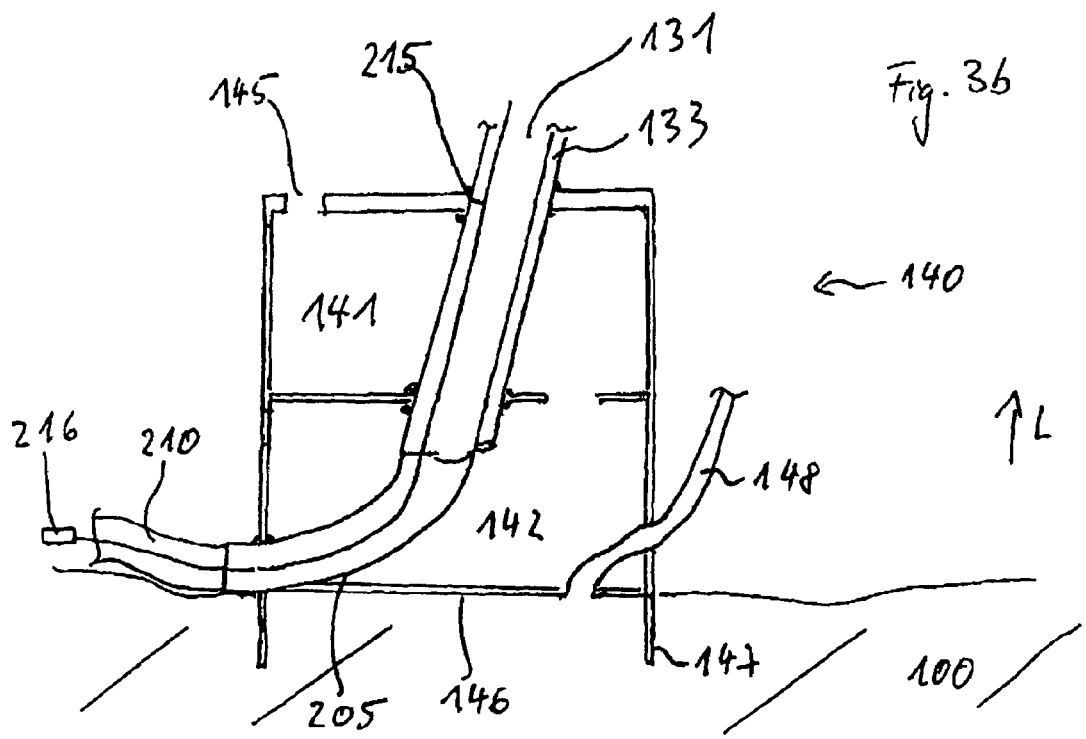
FIG. 3b shows a detailed view of a foot of a modified first embodiment according to FIG. 1.

FIG. 3b shows an embodiment of a foot in accordance with the invention that is modified relative to the embodiment shown in FIG. 3a. Filling line 133 runs outside of leg 131. A cable bunch with leads for removing the generated current as well as leads for controlling and monitoring the wind energy system is present in leg 131. The protected and simple laying of the cable bunch is important for a reliable operation of the system. In order to avoid a weakening of leg 131 by an opening of a cable bunch, a so-called J-tube 205 follows leg 131 on the end facing the ocean bottom. J-tube 205 runs through the wall of hollow chamber 142 at a location with little stress shortly above or below ocean bottom 100. J-tube 205 is followed by hose 210 on the side facing away from leg 131. Traction rope 215 is run through leg 131, J-tube 205 and hose 210 on land. A fastening element 216 for the cable bunch is provided on the hose end of traction rope 215. This fastening element can then be drawn with the aid of the traction rope through hose 210, J-tube 205 and leg 133 of the erected wind energy system.

A method for erecting the wind energy system can take place as follows: lattice tower 130 is brought to the erection site with floating aids that can be filled with air and is erected there on its feet 140 at the intended erection site on ocean bottom 110 by letting air out of the floating aids in a controlled manner. After the wind energy system has been placed on feet 140 the grout is conducted through filling line 133 in legs 131 into lower hollow chamber 142. Tubular leg 131 can also be utilized in its entirety as a filling line. A separate filling line 133 is then no longer necessary. The air displaced by the filled-in grout flows through passage opening 143 and out of air exit opening 145 out of lower hollow chamber 142 and upper chamber 141. The grout passes through passage opening 143 into upper hollow chamber 141 and also fills it with grout. The air in upper hollow chamber 141 can escape through upper air exit opening 145 until upper hollow chamber 141 is also completely filled with grout. Upper air exit opening 145 is optionally closed. The filling of feet 140 with grout increases the stability of the system against tilting. Thus, the filling counteracts a vertical as well as a horizontal slipping of feet 140. Alternatively, the filling of the feet can also be carried out on land. Combinations of both methods are conceivable, that is, a partial filling on land, floating out and residual ballasting on site can be advantageous as a function of the water depth, carrying capacity of the floating aids and of other location conditions. In the case of a 5 MW wind energy system the filling of a hollow chamber 141, 142 as an 8 m high cylinder with a diameter of 7 m with magna dense yields a ballast of 1100 t per foot.

Other embodiments with several hollow chambers 141, 142 arranged adjacent to each other in longitudinal direction L are conceivable that are connected to each other by other passage openings 143.

A suction bell 146, 147 arranged selectively on stop plate 146 counteracts in particular the vertical shifting of the wind energy system. Suction bell 146, 147 makes it possible to draw foot 140 by suction onto ocean bottom 100 and to thus create additional stabilization. Suction bell 146, 147 is shown in particular in FIGS. 1 to 3. In FIG. 3 suction bell 146, 147 is formed substantially by stop plate 146 and wall ring 147 surrounding it on its edge and sealing with stop plate 146 in an airtight manner. Furthermore, stop plate 146 has an opening designed as a connection piece for a venting hose or line 148. Venting hose 148 runs section-by-section through lower hollow chamber 142 and through a lateral wall out of lower hollow chamber 142 to ocean surface 110. Venting hose 148 is connected to a pump above of a surface 110. The pumping of air out of suction bell 146, 147 set on ocean bottom 100 causes foot 140 to be drawn by suction on the one hand onto ocean bottom 100 until stop plate 146 makes contact with ocean bottom 100, and on the other hand a vacuum is produced that prevents a shifting of the foot vertically to the ocean bottom, that is, in the vertical direction. In order to understand this suction effect, imagine as a comparison drawing an inverted bucket vertically out of a tub filled with water, during which a significant resistance is to be overcome.

Figure 4:
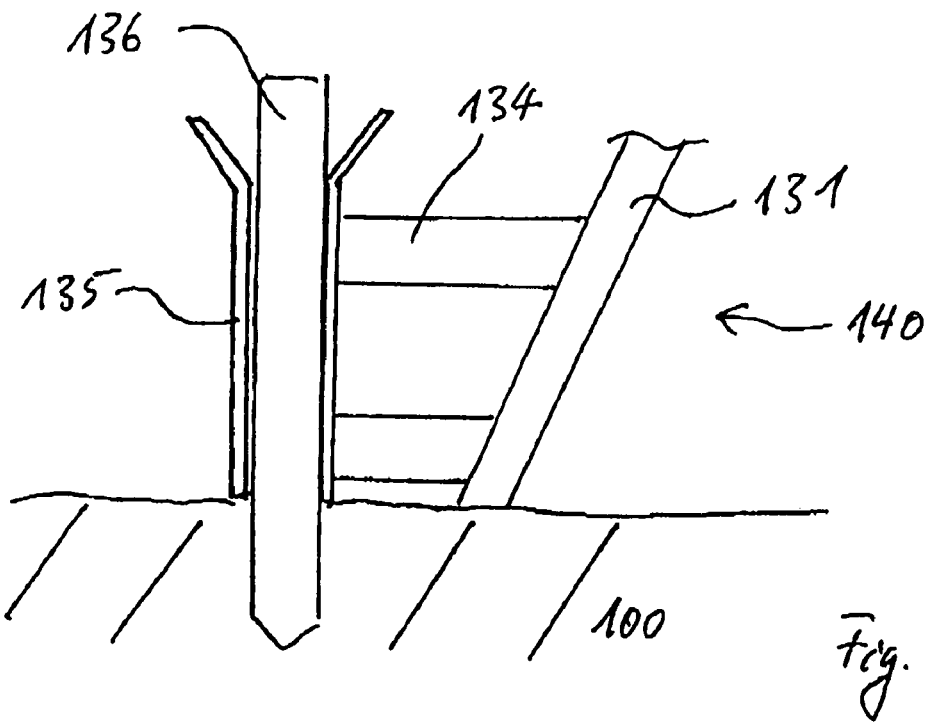
FIG. 4 shows a traditional foot of a second embodiment of an offshore wind energy system.

FIG. 4 shows another known embodiment of a foot 140 with which lattice towers 130 of traditional wind energy systems are anchored on ocean bottom 100. Each leg 131 of lattice tower 130 is connected via lateral struts 134 with the guide 135 for a peg 136. Peg 136 has a diameter of up to 3 meters and the length of several, up to eighty meters. Peg 136 is driven in guide 135 into ocean bottom 100, thus anchoring leg 131 firmly in ocean bottom 100. Normally, the carrier capacities of peg 136 for traction and pressure are different, that is, the tensile loading capacity is below the pressure loading capacity. In as far as the tensile loading capacity determines the length of peg 136, ballasted structural spacing component 141, 142 can also be used in a particularly advantageous embodiment to reduce the tensile load on the construction. This can also take place independently of a required longitudinal variability. The minimal extension in longitudinal direction L of structural spacing component 141, 142 and thus the amount of ballast can then be selected in such a manner at every location, especially at locations with a low water depth, that the required length of peg 136 is identical for tensile loading and pressure loading and that peg 136 is thus economically optimized.

Figure 5:
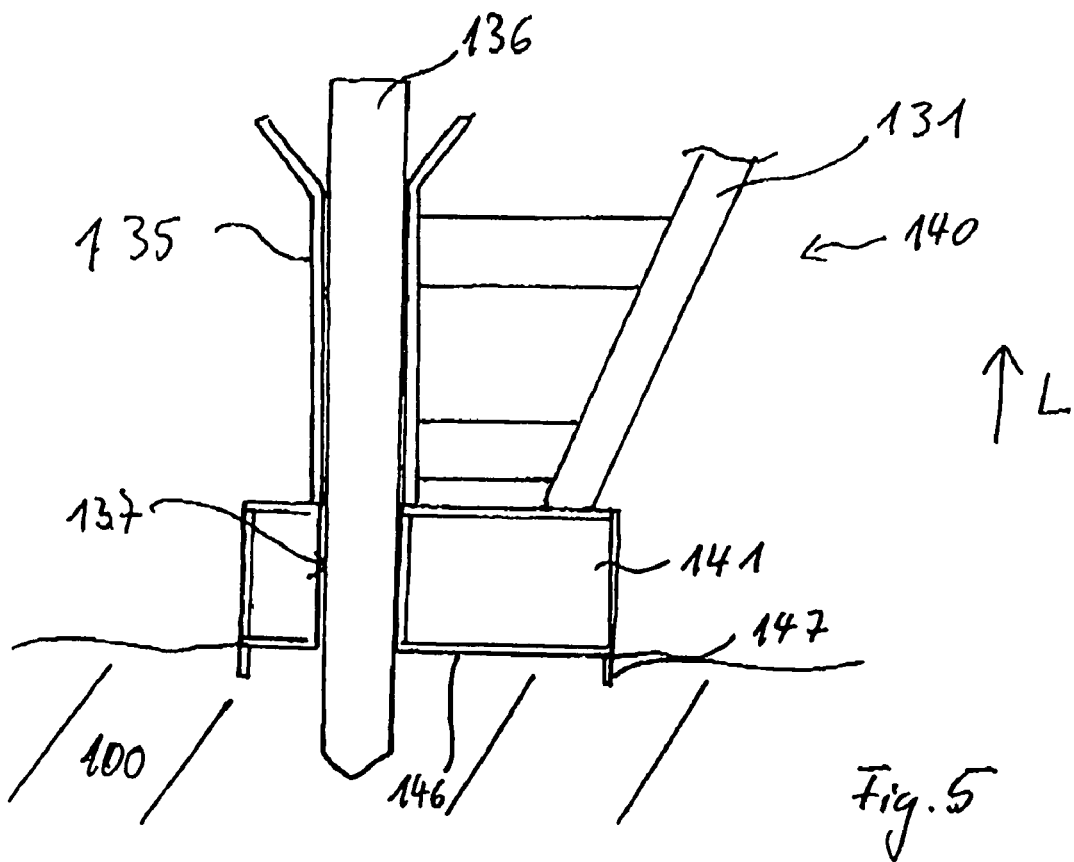
FIG. 5 shows a foot of a second embodiment in accordance with the invention of an offshore wind energy system.

FIG. 5 shows a further development in accordance with the invention of the further embodiment of foot 140. In this instance a hollow chamber 141 that can be filled with grout via filling line 133 inside leg 131 is provided on the end of leg 131 and guide 135 facing the ocean bottom. Hollow chamber 141 has a leadthrough 137 in an aligned extension of guide 135 for peg 136. Peg 136 in FIG. 5 is therefore longer by the length of hollow chamber 141 in longitudinal direction L than peg 136 in FIG. 4 in order to achieve a penetration depth into ocean bottom 100 corresponding to the embodiment in FIG. 4. The lower wall of hollow chamber 141 is also designed as stop plate 146 in FIG. 5 and delimits the penetration depth of foot 140 into ocean bottom 100. Stop plate 146 comprises wall ring 147 on its outer circumferential edge, which ring digs into ocean bottom 100 and prevents a horizontal slipping of foot 140. Stop plate 146 and wall ring 147 can also be parts of a suction bell in this embodiment.

The invention claimed is:

1. An offshore wind energy park comprising a plurality of wind energy systems wherein at least two of the wind energy systems are adapted to be placed at different water depths from each other while each of the at least two wind energy systems maintains the same height above water of a rotor hub, wherein each of the at least two wind energy systems when erected in a body of water has a longitudinal direction (L) running substantially vertically to the surface of the body of water, and wherein each of the at least two wind energy systems comprises a rotor which comprises a rotor hub, wherein the rotor hub of each of the at least two wind energy systems is positioned at the same height above the surface of the body of water irrespective whether the at least two wind energy systems are positioned at the same or different depths in the body of water, a standardized carrier structure having at least two legs, wherein each leg has a bottom, wherein the carrier structures of each of the at least wind energy systems are uniform in length relative to the other wind energy systems, wherein at the bottom of each leg is positioned a foot portion for making contact with the floor of the body of water at a contact point, and wherein each foot portion has an extension downward in the longitudinal direction (L) so as to compensate for an interval distance between the bottom of the leg and the floor of the body of water at the contact point, which interval distance is determined by the depth and/or the relief of the floor of the body of water.

2. The offshore wind energy park according to claim 1, wherein at least one foot portion comprises a structural spacing component that codetermines a distance that the foot portion extends in the longitudinal direction (L) to compensate for an interval distance.

3. The offshore wind energy park according to claim 2, wherein the structural spacing component is formed substantially by at least one hollow chamber that is suitable for containing filler material.

4. The offshore wind energy park according to claim 1, wherein at least one foot portion comprises a stop plate for limiting penetration depth of the foot portion into the floor of the body of water.

5. The offshore wind energy park according to claim 1, wherein the standardized carrier structure further comprises a lattice tower with a plurality of legs that have bottom ends, wherein the lattice tower and legs are uniform in length in each of the at least two wind energy systems, and wherein on the bottom ends of each of the plurality of legs one foot portion is arranged.

6. The offshore wind energy park according to claim 1, wherein at least one foot portion comprises a suction device that interfaces with the floor of the body of water and with which the at least one foot portion can be drawn onto the floor of the body of water.

7. The offshore wind energy park according to claim 6, wherein suction device is a suction bell.

8. An offshore wind energy park comprising a plurality of wind energy systems wherein at least two of the wind energy systems are adapted to be placed at different water depths from each other while each while each of the at least two wind energy systems maintains the same height above water of a rotor hub, which when erected in a body of water each of the at least two wind energy systems has a longitudinal direction (L) running substantially vertically to the surface of the body of water, and wherein the at least two wind energy systems each comprise a rotor which comprises a rotor hub, wherein the rotor hub of each of the at least two wind energy systems is positioned at the same height above the surface of the body of water irrespective whether the at least two wind energy systems are positioned at the same or different depths in the body of water, a standardized carrier structure having a tower and at least two legs that each have a bottom, wherein the carrier structures of each of the at least two wind energy systems are uniform in length relative to the other wind energy systems, and the tower of each of the at least two wind energy systems has the same standardized length relative to the other wind energy systems, wherein at the bottom of each leg is positioned a foot portion for making contact with the floor of the body of water at a contact point, and wherein each foot portion has an extension downward in the longitudinal direction (L) so as to compensate for an interval distance between bottom of the leg and the floor of the body of water at the contact point, which interval distance is determined by the depth and/or the relief of the floor of the body of water.

9. A method for erecting an offshore wind energy system in a wind energy park that includes a plurality of wind energy systems, which wind energy system when erected in a body of water has a longitudinal direction (L) running substantially vertically to the surface of the body of water, and which wind energy system comprises a rotor which comprises a rotor hub, a standardized carrier structure having at least two legs each having a bottom, wherein the carrier structure of the wind energy system is uniform in length relative to the carrier structure of at least one other wind energy system in the wind energy park, a foot portion positioned at the bottom of each leg, adapted for making contact with the floor of the body of water at a contact point, wherein each foot portion has an extension downward in the longitudinal direction (L), which method comprises the steps of determining the depth of the body of water at the contact point to make contact with the floor of the body of water, determining the desired height of the rotor hub above the surface of the body of water, wherein the height is predetermined by the height of a rotor hub of the at least one other wind energy system present in the wind energy park, so that the rotor hub of the wind energy system is positioned at the same height above the surface of the body of water as the at least one other wind energy system, irrespective whether the wind energy systems are positioned at the same or different depths in the body of water, determining the distance the each foot portion is to be extended downward in the longitudinal direction (L) so as to compensate for any interval distance between the bottom of the leg and the floor of the body of water at the contact point where each foot portion is positioned, and mounting each foot portion onto the carrier structure at each determined extension in the longitudinal direction (L).

10. The method according to claim 9, wherein the offshore wind energy system further comprises a hollow chamber arranged in the foot portion, and wherein the method further comprises the step of filling the hollow chamber with filler.

11. The method according to claim 9, wherein the offshore wind energy system has a plurality of foot portions adapted for making contact with the floor of the body of water, wherein at least one foot portion comprises a suction bell with which the at least one foot portion can be placed onto the floor of the body of water, which method further comprises the steps of positioning the suction bell on the floor of the body of water so that it forms a substantially airtight seal against the floor of the body of water, emptying the suction bell of substantially all air, and closing the suction bell in a substantially airtight manner.

* * * * *